United States Patent [19]

Bhakuni et al.

[11] 4,031,288

[45] June 21, 1977

[54] BONDING TIRE CORD TO RUBBER

[75] Inventors: Roop S. Bhakuni, Copley; Grover W. Rye, Cuyahoga Falls, both of Ohio

[73] Assignee: The Goodyear Tire & Rubber Company, Akron, Ohio

[22] Filed: June 18, 1975

[21] Appl. No.: 587,938

Related U.S. Application Data

[63] Continuation of Ser. No. 197,942, Nov. 11, 1971, abandoned.

[52] U.S. Cl. .............................. 428/395; 428/393; 428/394; 428/424; 428/480; 428/474; 427/407 R; 156/331
[51] Int. Cl.² .................... B29H 9/02; B29H 17/28
[58] Field of Search .......... 428/375, 380, 382, 383, 428/395, 393, 394, 424, 480, 474; 156/331, 334

[56] References Cited

UNITED STATES PATENTS

| | | | |
|---|---|---|---|
| 2,990,313 | 6/1961 | Knowles et al. | 428/395 |
| 3,240,650 | 3/1966 | Atwell | 428/522 |
| 3,268,467 | 8/1966 | Rye et al. | 156/331 |

*Primary Examiner*—Ralph S. Kendall
*Attorney, Agent, or Firm*—F. W. Brunner; J. A. Rozmajzl

[57] ABSTRACT

The bonding of tire cord to rubber is improved by first treating the surface of the tire cord with a solvent solution of a polyisocyanate in essentially small amounts and then treating the cord with an adhesive comprising a phenol/aldehyde resin, a phenol aldehyde resin blocked polyisocyanate and a rubber latex.

12 Claims, No Drawings

BONDING TIRE CORD TO RUBBER

This is a continuation of application Ser. No. 197,942, filed Nov. 11, 1971, now abandoned.

This invention relates to bonding tire cord to rubber by first treating the tire cord with a dilute solution of a polyisocyanate in the essential absence of moisture and other components reactive with a polyisocyanate, drying the treated cord and then treating the cord with an adhesive comprising a phenol/aldehyde resin, a phenol/aldehyde resin blocked polyisocyanate and a rubber latex.

Many different treatments of tire cord to improve the bond of the cord to the rubber have been disclosed in the patent literature. One patent of interest is U.S. Pat. No. 3,240,650 but the results obtained when following the teaching of the patent are inferior to those obtained here because the patent is concerned with the treatment of chaffer fabric where flexing of the fabric is not a problem.

It has now been discovered that a pneumatic tire built in accordance with the present invention will resist failure at the cord-to-rubber bond when the cord made of conventional tire cord material, including polyamides as well as polyester fiber, is first dipped in a solvent solution of a polyisocyanate to deposit less than 0.5 part and preferably less than about 0.4 part of polyisocyanate on the cord, and then after removal of the solvent depositing on the cord a specific adhesive composition known as a mixture of a rubber latex, a phenol/aldehyde resin and a phenol/aldehyde resin blocked polyisocyanate and hereinafter referred to for convenience as R/F/L/BNCO adhesive.

The full effect of treating the surface of the cord with an isocyanate is not obtained unless the cord is further treated with an R/F/L/BNCO adhesive. Thus the first treatment of the cord made with an unblocked isocyanate is further treated with an R/F/L adhesive containing a blocked isocynate. It is not known how the blocked isocyanate functions to produce the unexpectedly high resistance to fatigue measured under the flex stress produced in the side walls of a pneumatic tire, but the results obtained here have been long sought after in the industry. The polyisocyanate used in the first treatment of the cord is used in an inert solvent and in the substantial absence of components reactive with the NCO group. The polyisocyanate used in the R/F/L adhesive must be protected against reactive components such as water present in the R/F/L. It has been found that unexpectedly high resistance to fatigue at the cord-to-rubber bond is obtained when the isocyanate is blocked with a phenol/aldehyde resin.

The following isocyanates may be used in the first treatment of the cord when dissolved in a suitable inert solvent for the isocyanate.

Polymethylene polyphenylisocyanate (PAPI)
Triphenyl methane-triisocyanate (TMTI)
2,4-tolylene-diisocyanate (2,4-TDI)
2,6-tolylene-diisocyanate (2,6-TDI)
Bitolylene diisocyanate (TODI)
Dianisidine diisocyanate (DADI)
Hexamethylene diisocyanate (HDI)
m-Phenylene diisocyanate (PDI)
1-alkyl-benzene-2,4-diisocyanate (AB-2,4-DI)
1-alkyl-benzene-2,5-diisocyanate (AB-2,5-DI)
2,6-dialkyl-benzene-1,4-diisocyanate (DBDI)
1-chlorobenzene-2,4-diisocyanate (CDI)
Dicyclohexylmethane-diisocyanate (CXDI)
3,3-dimethoxy diphenyl methane-4,4'-diisocyanate (DDMDI)
1-nitrobenzene-2,4-diisocyanate (NDI)
1-alkoxy-benzene-2,4-diisocyanate (ABDI)
1-alkylbenzene-2,6-diisocyanate (ADI)
m-Xylylene-diisocyanate (XDI)
1,3-dimethyl-4,6-bis($\beta$-isocyanatoethyl)-benzenediisocyanate (DBIBDI)
Hexahydrobenzidine-4,4'-diisocyanate (HBDI)
Ethylene-diisocyanate (EDI)
Propylene-1,3-diisocyanate (PDI)
Cyclohexylene-1,2-diisocyanate (CDI)
3,3'-dichloro-4,4'-biphenylene diisocyanate (DBDI)
2,3-dimethyl-tetramethylene diisocyanate (DTDI)
p,p'-Diphenylene diisocyanate (DPDI)
2-chlorotrimethylene diisocyanate (CTDI)
Butane-1,2,2-triisocyanate (BTI)
Trimethylene diisocyanate (TMDI)
Tetramethylene diisocyanate (TDI)
Propylene-1,2-diisocyanate (PDI)
Butylene-1,2-diisocyanate (BDI)
Ethylidene diisocyanate (EDI)
Metaphenylene diisocyanate (MPDI)
Diphenylmethane 4,4'-diisocyanate (DP-4,4-DI)
Diphenyl 4,4'-diisocyanate (DPDI)
1,5-Diisocyanate naphthalene (1,5-DIN)
2,4-Diisocyanate chlorbenzene (2,4-DICB)
4,4',4''-Triisocyanate triphenyl methane (4,4',4''-TITM)
Polymethylene diisocyanate (PMDI)

Suitable inert solvents for the isocyanates are (1) chlorinated hydrocarbons including methylene chloride, trichlorethylene, dichlorethane, trichlorethane, (2) esters including methyl acetate, ethyl acetate, (3) ketones including acetone and methyl ethyl ketone, and (4) aromatic solvents including benzene and toluene. These solvents are removed from the cord by heating the cord at about the boiling point of the solvent and usually between about 150° F. to about 350° F.

The combination of the first and second cord treatments of this invention may be applied to tire cord made of such material as regenerated cellulose also known as rayon, linear polyamides also known as nylon 6, nylon 66, and aromatic nylons such as p-aminobenzoic acid polymer (p-abap) as described in French Pat. No. 1,526,745, linear polyesters such as polyethylene terephthalate also known as Dacron and Vycron, linear polyaminotriazoles, glass fibers, linear polycarbonates, linear polyethers and polyurethanes, wire and linear polyolefins. Especially improved adhesion and resistance to fatigue is found when bonding the polyesters and the polyamides to rubber. The tire cord treated by the process of this invention is made in a conventional manner using, for example, polyethylene terephthalate filaments as a yarn having a total denier of approximately 7800 drawn 6 to 1 to about 1300 denier which yarn is plied 8 turns per inch, 3 plies of which are twisted 8 turns per inch in reverse direction to form a cord referred to as 1300/3,8/8.

In the second dip containing a blocked isocyanate any of the polyisocyanates above listed may be blocked with an R/F resin in the following manner: 110 parts of resorcinol, 25 parts by volume of formalin (37% formaldehyde in methanol and water), and 20 parts by volume of water is reacted together in a reaction vessel equipped with both heating and cooling coils, a reflux condenser and a suitable agitator. The mixture is heated to reflux temperature (100° C.) and allowed to remain at this temperature for 15 minutes, after which an additional 30 parts by volume of formalin was added to the reaction mixture over a period of 10 minutes. After being refluxed for an additional 30 minutes, the resin formed in the reaction vessel was allowed to cool to room temperature. A thick, syrupy resin (for convenience referred to as Resin A) containing 60 percent solids, a viscosity of 750 cps. and a pH of 7 was obtained.

Twenty parts of the Resin A described above is reacted with 6 parts of polymethylene polyphenylisocyanate for 48 hours at 72° F. At the end of this time, the resulting reaction mixture is treated with 0.1 part of sodium hydroxide and 100 parts of water. The resulting neutralized resin-blocked polyisocyanate may be used as such or may be allowed to age for 8 hours before being used, (and for convenience to be referred to as resin BNCO).

The R/F/L/BNCO adhesive used as a second cord treatment is prepared as follows: a 20 percent solids dispersion of an adhesive conventionally known as R/F/L is made in accordance with the following formula.

| R/F/L Adhesive | |
|---|---|
| Ingredients | Parts |
| Resorcinol | 98 |
| Formaldehyde (37%) | 53 |
| Terpolymer rubber latex of styrene/butadiene-1,3/vinylpyridine 15/70/15 (41%) | 1152 |
| Water | 543 |

This R/F/L adhesive is prepared by adding 98 parts of the resorcinol to 196 parts of water, followed by the addition of 53 parts of formaldehyde. The resulting mixture is aged for one hour and then 1152 parts of terpolymer rubber latex is added. The resulting mixture is aged for a period of 72 hours. After aging, the balance of the water is added. To 65 parts of this R/F/L composition is added 35 parts of the resin blocked isocyanate BNCO described above and allowed to age at 72° F. for 4 hours. This is the adhesive used for the second treatment of the tire cord.

This invention is described by example as follows where all parts are by weight.

EXAMPLE 1

A reinforcing element comprising a polyester cord 1300/3,8/8 (referred to as P/E) as described above is treated by passing the cord through a composition comprising a solvent (1,1,1-trichlorethane) solution of polymethylene polyphenylisocyanate (PAPI) for the formula

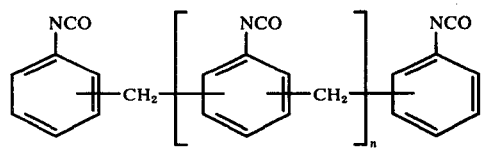

where $n$ has an average value of 1.2 and a Brookfield viscosity of 1500 cps measured at 25° C. using a No. 3 spindle revolving at 250 rpm. The amounts of polyisocyanate deposited on the cord is shown in Table I. The polyisocyanate treated cord is then dried to remove the solvent from the cord and the dried cord is then treated with the R/F/L/BNCO adhesive prepared above by passing the cord through the adhesive at such a rate as to deposit on the surface of the cord between about 3% to about 10% adhesive solids and preferably 4% as was deposited in the experiments in Table I. This may be achieved by passing the cord through the adhesive composition at the rate of between about 20 yards to about 30 yards per minute and then drying the adhesive on the cord at a temperature of about 425° F. for about 2½ minutes. The treated cord is then imbedded in a rubber stock compounded as follows.

| Rubber Stock | |
|---|---|
| Ingredients | Parts |
| Natural rubber | 100 |
| Zinc oxide | 3.00 |
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

A heat durability test is made by forming a tube of rubber reinforced with the cord first treated with a polyisocyanate, then with the R/F/L/BNCO adhesive in the manner described above and then tested in accordance with the "Mallory" tube fatigue test described in ASTM D-885-59T, Section 42, and also as described in U.S. Pat. No. 2,412,524. Table I shows how the conditions of cord treatment affect peel adhesion and fatigue. In each instant the same amount of second dip is applied to the cord, i.e., 4 parts per 100 parts of cord. Amounts between 5 and 25 parts may be used.

The following table sets forth experiments all of which were run in accordance with the procedure set forth in Example I with changes as noted in the body of the table.

TABLE I

| | | | Effect of Variations in Second Dip | | | |
|---|---|---|---|---|---|---|
| Ex. | First Dip | Dry Solids | Second Dip | Peel Force | Fatigue | Cord |
| 1 | PAPI | 4.8% | R/F/L | 100 | 100 | P/E |
| 2 | PAPI | 4.8% | R/F/L/BNCO | 102 | 112 | P/E |
| | | | Effect of First Dip Concentration | | | |
| 3 | PAPI | 4.8% | R/F/L | 100 | 100 | P/E |
| 4 | PAPI | 4.8% | R/F/L/BNCO | 102 | 112 | P/E |
| 5 | PAPI | .4% | R/F/L | 131 | 125 | P/E |
| 6 | PAPI | .4% | R/F/L/BNCO | 111 | 201 | P/E |
| 7 | PAPI | .25% | R/F/L/BNCO | 101 | 228 | P/E |
| 8 | PAPI | .12% | R/F/L/BNCO | 101 | 268 | P/E |
| | | | Effect of Carboxyl Content of Polyester Cord | | | |
| | | | | | | Carboxyl Content of P/E |

TABLE I-continued

| | | | | | | Equiv./10⁶ Grams |
|---|---|---|---|---|---|---|
| 9 | PAPI | .4% | R/F/L/BNCO | 110 | 110 | 35 |
| 10 | PAPI | .4% | R/F/L/BNCO | 100 | 100 | 18 |
| 11 | PAPI | .4% | R/F/L/BNCO | 99 | 149 | 5 |
| *Effect of Modified Polyester* | | | | | | |
| | | | | | | Modifier |
| 12 | PAPI | .4% | R/F/L/BNCO | 100 | 100 | None |
| 13 | PAPI | .4% | R/F/L/BNCO | 103 | 250 | Polycarbonate Texin Cumate |
| *Effect of Second Dip Variation on Nylon 66* | | | | | | |
| 14 | PAPI | .4% | R/F/L | 100 | 100 | Nylon 66 |
| 15 | PAPI | .4% | R/F/L/BNCO | 115 | 110 | Nylon 66 |
| *Effect of First Dip Concentration on p-abap* | | | | | | |
| 16 | PAPI | None | R/F/L/BNCO | 100 | 100 | p-abap |
| 17 | PAPI | 0.1% | R/F/L/BNCO | 160 | 100 | p-abap |
| 18 | PAPI | .2% | R/F/L/BNCO | 158 | 200 | p-abap |
| 19 | PAPI | .4% | R/F/L/BNCO | 142 | 95 | p-abap |

From the data shown in Table I it is observed that the amount of polyisocyanate in the first treatment of the cord is critical in producing maximum values in resistance to fatigue when the polyisocyanate is used in combination with an R/F/L/BNCO adhesive composition. Experiment 2 shows a 12% advantage using R/F/L/BNCO as the second dip over R/F/L as the second dip, while using a 4.8% deposition of PAPI on the cord in the first dip. More important is the discovery that the resistance to fatigue is maximized as the amount of PAPI deposited on the cord in the first dip is reduced to 0.4 consistant with acceptable peel values while fatigue values continue to increase as the amount of PAPI is decreased.

Maximum values of fatigue are accomplished only with the combination of R/F/L/BNCO and small amounts of PAPI as shown by Experiments 6, 7 and 8. The unexpected function of the combination of PAPI and R/F/L/BNCO is also shown when using polyester cords of decreasing carboxyl content as shown in Experiments 9, 10 and 11. No explanation can be given for the improvement in fatigue. It is generally known that peel adhesion decreases as the carboxyl content of the polyester cord decreases, it being theorized that fewer sites are available for adhesive bonding. Again when the polyester cord is modified with certain additives as shown in U.S. Pat. No. 3,563,848, an improvement is also observed in fatigue over cord not modified with an additive. The combination of cord treatment of this invention also is useful when treating the p-aminobenzene carboxylic acid polymer as shown by Experiments 16, 17, 18 and 19. In each of experiments 1 through 8 the carboxyl content of the polyester cord was 35. The modification of the polyester cord in experiment 13 is shown in U.S. Pat. No. 3,563,848.

The treatment of polyester fiber by the method of this invention is especially effective in the construction of a conventional tubeless pneumatic tire comprising an open-bellied, hollow annular body terminating in spaced apart bead portions as described in U.S. Pat. No. 2,987,094. The tire is made with plies of polyester cord bonded to rubber with the polyisocyanate pretreatment followed by treatment with the R/F/L/BNCO adhesive as described above as a second dip, dried on the cord at about 425° F. for about 2½ minutes.

While certain representative embodiments and details have been shown for the purpose of illustrating the invention, it will be apparent to those skilled in this art that various changes and modifications may be made therein without departing from the spirit or scope of the invention.

What is claimed is:

1. A tire polyester cord the surface of which contains an effective amount and less than 0.5 part by weight per 100 parts of cord of a polyisocyanate having the following structural formula

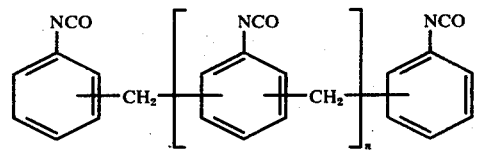

where $n$ is greater than 1.2 and has a Brookfield viscosity measured at 25° C. using a No. 3 spindle revolving at 250 rpm of at least 1000 cps, said polyisocyanate being deposited from a solvent solution thereof as a first treatment and deposited thereon a second coating containing the addition product of a polyisocyanate and a water-soluble thermoplastic resin resulting from the reaction of an formaldehyde and a resorcinol, a resinous reaction product of a resorcinol and an formaldehyde and a rubber latex.

2. The cord of claim 1 wherein the polyisocyanate is polymethylene polyphenyl isocyanate.

3. The cord of claim 2 wherein the polymethylene polyphenyl isocyanate has a Brookfield viscosity of 1500 cps at 25° C.

4. The cord of claim 1 made of polyester.

5. The cord of claim 1 made of polyamide.

6. The cord of claim 1 made of p-aminobenzoic acid polymer.

7. A method of treating a polyethylene terephthalate cord with a first dip which comprises treating the cord with a solvent solution of a polyisocyanate having the following structural formula

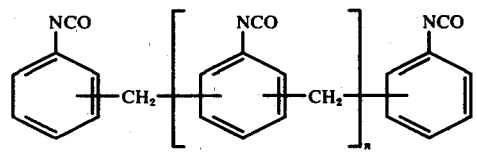

where $n$ is greater than 1.2 and has a Brookfield viscosity measured at 25° C. using a No. 3 spindle revolving at 250 rpm of at least 1000 cps, removing the solvent from the treated cord to deposit less than 0.5 part by weight per 100 parts of cord of the polyisocyanate and then treating the cord with a second dip containing the addition product of a polyisocyanate and a water soluble thermoplastic resin resulting from the reaction of an formaldehyde with a phenol, a resinous reaction product of a phenol and an formaldehyde and a rubber latex.

8. The method of claim 7 wherein the polyisocyanate in the first dip is polymethylene polyphenyl isocyanate.

9. The method of claim 8 wherein the polyisocyanate in the first dip has a Brookfield viscosity of 1500 cps at 25° C.

10. The method of claim 7 wherein the solvent is 1,1,1-trichlorethane.

11. A method of treating a polyethylene terephthalate cord with a first dip which comprises treating the cord with a solvent containing a polyisocyanate having the following structural formula

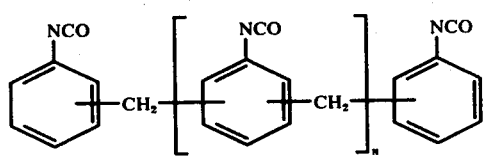

where $n$ is greater than 1.2 and has a Brookfield viscosity measured at 25° C. using a No. 3 spindle revolving at 250 rpm of at least 1000 cps, removing the solvent by heating the treated cord at a temperature between about 150° F. and about 350° F. to deposit less than 0.5 part by weight per 100 parts of cord of the polyisocyanate, and then treating the cord with a second dip containing the addition product of a polyisocyanate and a water soluble thermoplastic resin resulting from the reaction of an formaldehyde with a resorcinol, a resinous reaction product of a resorcinol and an formaldehyde and a rubber latex and heating the adhesive treated cord at a temperature of at least 425° F. and below the melting point of the cord.

12. A heat stable structure comprising rubber reinforced with the cord prepared in the manner of the method of claim 11.

* * * * *